(12) United States Patent  
Bogenrieder et al.

(10) Patent No.: US 12,071,097 B2  
(45) Date of Patent: Aug. 27, 2024

(54) METHOD FOR DYNAMIC SECURING

(71) Applicant: DAIMLER AG, Stuttgart (DE)

(72) Inventors: Ralf Bogenrieder, Stuttgart (DE); Uwe Merz, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 388 days.

(21) Appl. No.: 17/598,991

(22) PCT Filed: Mar. 18, 2020

(86) PCT No.: PCT/EP2020/057490  
§ 371 (c)(1),  
(2) Date: Sep. 28, 2021

(87) PCT Pub. No.: WO2020/200793  
PCT Pub. Date: Oct. 8, 2020

(65) Prior Publication Data  
US 2022/0185230 A1    Jun. 16, 2022

(30) Foreign Application Priority Data  
Mar. 29, 2019  (DE) .................. 10 2019 002 308.0

(51) Int. Cl.  
*B60R 22/46* (2006.01)  
*B60R 21/0134* (2006.01)

(52) U.S. Cl.  
CPC .......... *B60R 22/46* (2013.01); *B60R 21/0134* (2013.01); *B60R 2022/4685* (2013.01)

(58) Field of Classification Search  
CPC ............... B60R 22/46; B60R 21/0134; B60R 2022/4685  
See application file for complete search history.

(56) References Cited

U.S. PATENT DOCUMENTS 8,775,030 B2    7/2014  Mages  
9,150,194 B2    10/2015 Erlacher et al.  
(Continued)

FOREIGN PATENT DOCUMENTS

CN    102730001 A    10/2012  
CN    102730002 A    10/2012  
(Continued)

OTHER PUBLICATIONS

Office Action dated Dec. 5, 2022 in related/corresponding CN Application No. 202080022195.3.  
(Continued)

*Primary Examiner* — Brian P Sweeney  
(74) *Attorney, Agent, or Firm* — PATENT PORTFOLIO BUILDERS PLLC

(57) ABSTRACT

A method for dynamically securing an occupant strapped into a vehicle seat with a seat belt involves determining a lateral acceleration of the vehicle and a road course ahead of the vehicle. A lateral acceleration to be expected in the course of a bend ahead of the vehicle is predicted based on image data of a vehicle environment acquired by means of at least one camera on the vehicle and/or on the basis of acquired data of a navigation map. In the event that the predicted lateral acceleration exceeds a situation-dependent predetermined trigger threshold for tightening the seat belt, a belt force acting on the seat belt is increased before the lateral acceleration acts on the occupant.

7 Claims, 1 Drawing Sheet

(56) References Cited

U.S. PATENT DOCUMENTS

Figure 1:
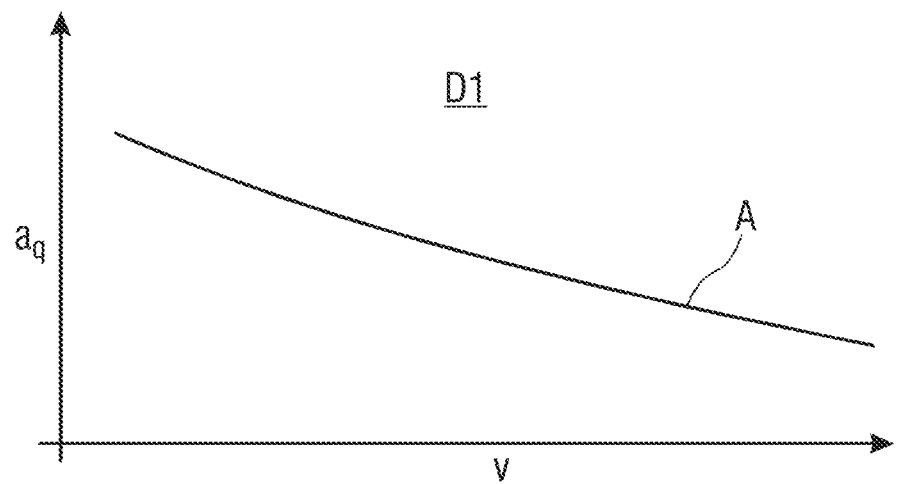

| | | | |
|---|---|---|---|
| 9,527,407 | B2 | 12/2016 | Erlacher et al. |
| 2012/0146384 | A1* | 6/2012 | Mages ............... B60R 21/0132 |
| | | | 297/468 |
| 2014/0263800 | A1* | 9/2014 | Erlacher ................ B60R 22/35 |
| | | | 242/384 |
| 2021/0001801 | A1 | 1/2021 | Birk et al. |

FOREIGN PATENT DOCUMENTS

| | | | |
|---|---|---|---|
| DE | 102008033480 A1 | 1/2010 |
| DE | 102008050316 A1 | 5/2010 |
| DE | 102008050317 A1 | 5/2010 |
| DE | 102009033689 A1 | 1/2011 |
| DE | 102009049195 A1 | 4/2011 |
| DE | 102009056990 A1 | 6/2011 |
| DE | 102010053352 A1 | 6/2012 |
| DE | 102011016229 A1 | 10/2012 |
| DE | 102011106247 A1 | 1/2013 |
| DE | 102013220551 A1 | 4/2015 |
| DE | 102018002559 A1 | 10/2019 |
| WO | 2005012047 A1 | 2/2005 |
| WO | 2011006626 A1 | 1/2011 |
| WO | 2013004342 A1 | 1/2013 |

OTHER PUBLICATIONS

Office Action created Nov. 4, 2022 in related/corresponding DE Application No. 10 2019 002 308.0.
International Search Report mailed Jun. 30, 2020 in related/corresponding International Application No. PCT/EP2020/057490.
Office Action created Jan. 15, 2020 in related/corresponding DE Application No. 10 2019 002 308.0.
Written Opinion mailed Jun. 30, 2020 in related/corresponding International Application No. PCT/EP2020/057490.

* cited by examiner

METHOD FOR DYNAMIC SECURING

BACKGROUND AND SUMMARY

Exemplary embodiments of the invention relate to a method for dynamically securing an occupant strapped into a vehicle seat of a vehicle with a seat belt, wherein a lateral acceleration of the vehicle as well as a road course ahead of the vehicle are determined.

DE 10 2008 050 316 A1 discloses a method and device for dynamically securing a vehicle occupant strapped into a seat of a vehicle with a seat belt. The method provides that lateral dynamics of the vehicle are determined. A belt loop of the seat belt is partially retracted by means of a belt retractor when an upper threshold value of the lateral dynamics is exceeded, and a curve radius of a road ahead remains constant or decreases.

Moreover, DE 10 2008 050 317 A1 discloses a method for dynamically securing a vehicle occupant strapped into a seat of a vehicle with a seat belt. The method provides that lateral dynamics of the vehicle are determined. A belt loop of the seat belt is at least partially retracted by means of a belt retractor when an upper threshold value of the lateral dynamics is exceeded.

Furthermore, DE 10 2009 056 990 A1 describes a method for a vehicle-dynamic adaptation of an occupant securing, which is carried out by activating at least one means of occupant restraint, wherein the method determines a time for the activation. Information about a future road course of a navigation system as well as current vehicle data are taken into account. In a first step, a bend course and a bend start of the bend course of a bend are initially roughly determined based on road course data and a current vehicle position. In a second step, a more precise determination of an exact bend start and thus of the bend course is carried out, in which the exact bend start or a distance to the exact bend start is determined by an image-evaluating camera system or by a beam measurement. The point in time for activating the occupant securing is also made dependent on a time period which is expected to be required until the vehicle position reaches the exact start of the bend.

Furthermore, DE 10 2010 053 352 A1 discloses a method for a vehicle-dynamic adaptation of an occupant securing, which is carried out by activating at least one means for occupant securing, wherein a time for the activation is determined by the method taking into account current vehicle data. The method further provides that a determination of a start of a bend and a course of a bend are determined by an image evaluating camera system or by a beam measurement. The time for the activation of the occupant securing is made depending on a time period which is expected to be required until the vehicle reaches the start of the bend.

Exemplary embodiments of the invention are directed to a method, which is improved in comparison with the prior art, for dynamically securing an occupant who is strapped into a vehicle seat of a vehicle by means of a seat belt.

A method for dynamically securing an occupant strapped with a seat belt into a vehicle seat of a vehicle provides that a lateral acceleration of the vehicle as well as a road course ahead of the vehicle are determined. According to the invention, a lateral acceleration to be expected in the course of a bend ahead of the vehicle is predicted on the basis of image data of a vehicle environment acquired by means of at least one camera onboard the vehicle and/or on the basis of acquired data of a navigation map, wherein, in the event that the predicted lateral acceleration exceeds a predetermined situation-dependent trigger threshold, a belt force acting on the seat belt is increased before the lateral acceleration acts on the occupant.

By applying the method, i.e., by preventive and situation-dependent belt tensioning considerably before entering a bend, the occupant is haptically warned of bends in which increased lateral acceleration is to be expected. A plausibility of the belt tensioning, i.e., the increase in belt force, is significantly improved by the situation-dependent adaptation of the trigger threshold.

Since the occupant is made aware of the imminent increased lateral acceleration by the tightening of the seat belt when approaching a bend, the occupant, who is in particular the driver of the vehicle, has the possibility to brake and thus to reduce a current driving speed of the vehicle, whereby a possibly existing risk of accident can be at least substantially reduced.

Here, the method serves to secure the occupant in a driving-adaptive manner, whereby the occupant is secured in the vehicle seat and thus a lateral displacement of the occupant in the vehicle seat in the direction of an outer side of a bend is counteracted.

One embodiment of the method provides that the trigger threshold for increasing the seat belt force is adapted as a situation depending on a set driving mode, detected signals from at least one rain sensor, a time of day and/or ambient light, an outside temperature, a detected local accident frequency and/or determined information from traffic signs.

Thus, several situation-dependent trigger thresholds are stored, wherein these are plausibly designed according to the situation.

In a further embodiment of the method, a maximum lateral acceleration occurring when driving through a bend ahead of the vehicle is predicted, wherein if the predetermined situation-dependent trigger threshold is exceeded, the seat belt is tightened with a predetermined further belt force a predetermined period of time before the predicted maximum lateral acceleration is reached.

If the maximum lateral acceleration to be expected in the course of the bend at the point of the bend with the highest curvature is above the predetermined trigger threshold, then the seat belt is tightened at the beginning of the bend before any lateral acceleration that is measurable or that can be noticed by the occupant and thus a lateral displacement of the occupant occurs. The seat belt is tightened in such a way that it lies comparatively close to the occupant's body. If the vehicle drives round the bend and a certain lateral acceleration acts on the vehicle, a standard seat belt locking mechanism engages such that a length of the seat belt cannot change, and the belt force is passively based on how strongly the occupant is pressed into the seat belt by the inertial forces acting in the lateral direction. An active readjustment, in particular active tightening of the seat belt with a pre-defined belt force, is therefore not necessary.

In the event of a predicted lateral acceleration exceeding a predetermined threshold value when driving round the bend, the seat belt is tightened with a predetermined belt force in a development, wherein if a higher predetermined further threshold value is exceeded when driving round the bend, the seat belt is tightened with a predetermined higher belt force.

Thus, when the further threshold value is exceeded, the seat belt is tightened with a noticeably higher belt force, whereby the occupant is alerted to the increase in lateral acceleration acting on him/her.

In a development of the method, the seat belt is tightened by means of an electric motor, such that the tightening can be carried out reversibly.

In one possible embodiment, the maximum lateral acceleration is determined when driving round a bend on the basis of acquired curvature data and an acquired current vehicle speed and/or on the basis of a driver type.

This determines how sportily the vehicle will drive round the bend and what maximum lateral acceleration can be expected. The lateral acceleration to be expected in the course of the bend to be driven round is therefore determined on the basis of the vehicle's inherent speed and/or the type of driver and the curvature of the bend, i.e., the driving route.

Furthermore, the method provides that the acquired image data of the at least one camera are checked for plausibility by means of the determined data of the navigation map and/or that the determined data of the navigation map are checked for plausibility by means of the acquired image data of the at least one camera. Thus, it is checked which situation is present in the immediate environment, wherein it is also checked, at least with respect to the data of the navigation map, whether a bend lies ahead of the vehicle.

Exemplary embodiments of the invention are explained in more detail below with reference to drawings.

BRIEF DESCRIPTION OF THE DRAWING FIGURE

Figure 2:
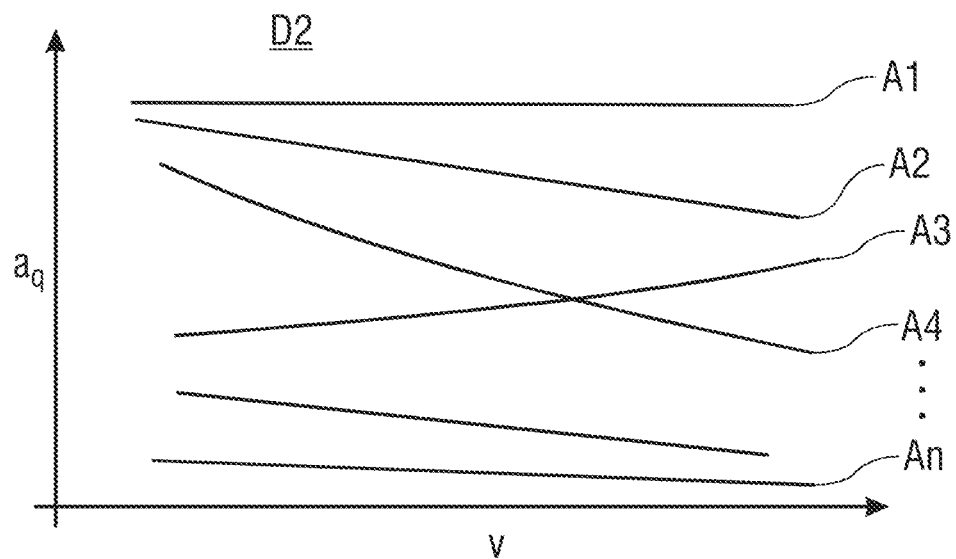

Here are shown:

FIG. 1 schematically, a diagram with a fixed predetermined trigger threshold for tightening a seat belt of a vehicle according to the prior art, and FIG. 2 schematically, another diagram with a number of situation-dependent trigger thresholds for tightening the seat belt of the vehicle.

Parts corresponding to one another are provided with the same reference numerals in all figures.

DETAILED DESCRIPTION

FIG. 1 shows a diagram D1 having a trigger threshold A for tightening a seat belt of a vehicle during cornering according to the prior art.

If the vehicle is driving round a bend and a lateral acceleration $a_q$, acting depending on a vehicle speed v, exceeds the trigger threshold A, the seat belt is tightened comparatively easily, i.e., with a comparatively low belt force. The tightening occurs by means of an electric motor, i.e., reversibly.

The trigger threshold A is fixedly predetermined depending on the vehicle's speed v and is stored in the vehicle.

Instead of tightening the seat belt in response to a lateral acceleration $a_q$ already acting on the vehicle and thus its occupants, it is provided to preventively increase a belt force before the relevant lateral acceleration $a_q$ acts on the vehicle. This means that the seat belt is tightened as soon as the vehicle approaches a bend. The preventive tightening of the seat haptically warns the occupant, in particular a driver of the vehicle, a haptic warning when the vehicle approaches the bend, wherein the seat belt is tightened when the vehicle approaches a bend in which an increased lateral acceleration $a_q$ is to be expected.

For this purpose, image data from at least one camera onboard the vehicle and data from at least one navigation map stored in the vehicle are taken into account, wherein the image data are checked for plausibility with the data from the navigation map and vice versa.

In addition, a plurality of trigger thresholds A1 to An shown in a further diagram D2 in FIG. 2 are stored, such that the tightening of the seat belt, i.e., the belt force acting on the seat belt, takes place depending on the situation.

The data from the navigation map and the acquired image data from the camera are used, in particular, to determine where the next bend to be driven round is located on a road ahead of the vehicle. It is therefore known when the vehicle is approaching a bend.

Curvature data relating to a bend ahead can also be determined on the basis of the data from the navigation map and/or on the basis of the acquired image data.

This curvature data can be evaluated to determine how far the vehicle is from a vertex of the bend.

Furthermore, the determined curvature data can be used in conjunction with a current driving speed v of the vehicle to estimate how sportily the bend can be driven round and what maximum lateral acceleration $a_q$ can probably be expected when driving round the bend. Alternatively, or additionally, a driver type can be used to determine how sportily the bend will be driven round and what the maximum lateral acceleration $a_q$ will be as a result.

The accuracy of the prediction can be increased in that a current longitudinal acceleration of the vehicle is taken into account when determining the maximum lateral acceleration $a_q$.

In other words, the vehicle's inherent speed and the curvature of a road ahead of the vehicle are used to determine the lateral acceleration $a_q$ to be expected in the course of the bend to be driven round. A lateral acceleration prediction is thus generated.

Based on the data from the navigation map, the acquired image data, further situation information, and the vehicle's speed v, a trigger threshold A1 to An corresponding to the present situation is determined, which is used as the basis for tightening the seat belt before the bend-related lateral acceleration $a_q$ acts on the vehicle and thus on the occupants. In other words, the seat belt is tightened before the vehicle enters the bend and the lateral acceleration $a_q$ thus acts on the vehicle.

A situation representing a first influencing variable for a first trigger threshold A1 is a set driving mode of the vehicle, a so-called dynamic selection switch position. If, for example, a sport mode is set, the first trigger threshold A1 for increasing the belt force is comparatively high.

Detected signals from a rain sensor as an influencing variable provide a situation for a second trigger threshold A2, wherein the second trigger threshold A2 is lower than the first trigger threshold A1 when rain is detected. In this case, the second trigger threshold A2 can be graded accordingly depending on a determined precipitation intensity.

A further influencing variable is a detected time of day or a detected ambient brightness, wherein a third trigger threshold A3 is comparatively low in darkness.

Furthermore, an outside temperature is an influencing variable for tightening the seat belt, wherein a fourth trigger threshold A4 is arranged relatively low when the outside temperature is low and there is a risk of slippery roads due to snow and/or ice.

If it is determined that the vehicle is in an environment with a locally increased accident frequency, a fifth trigger threshold A5 not explicitly depicted in FIG. 2 is selected and set for potentially more dangerous bends, such that the seat belt is already tightened on approaching such a bend in order to warn a driver of the occupant in relation to the bend ahead and the transverse acceleration $a_q$ caused thereby. The locally increased accident frequency can thereby be determined on the basis of data stored in a so-called accident atlas.

In one embodiment of the method, the camera is part of an assistance system for traffic sign recognition. This makes it possible to store a sixth trigger threshold A6 for tightening the seat belt, which is also not explicitly depicted in FIG. 2 and is set depending on information displayed accordingly by means of a traffic sign. In particular, the sixth trigger threshold A6 is set if the traffic sign warns of a bend and/or a substantially reduced speed limit is indicated by means of the traffic sign.

All depicted bends of the trigger threshold A1 to An are purely exemplary and are only intended to explain the basic principles in more detail. Furthermore, the dependencies of the different trigger thresholds A1 to An can also be combined, wherein the trigger thresholds can also be stored, for example, as a characteristic diagram depending on various parameters and the bend negotiating speed.

It is particularly important that the trigger threshold of a lateral acceleration $a_q$ in a bend for belt tensioning is not only speed-dependent, but can also depend on other parameters which then increase or decrease the trigger thresholds of the lateral acceleration $a_q$.

The situation-dependent preventive tightening of the seat belt considerably before the vehicle enters the bend provides the driver of the vehicle with a haptic warning that increased lateral acceleration $a_q$ is to be expected.

Moreover, by setting a trigger threshold A1 to An corresponding to the respective situation, such a warning is plausible for the driver of the vehicle.

As described above, the maximum lateral acceleration $a_q$ is determined when driving round the bend, wherein if the predetermined situation-dependent trigger threshold A1 to An is exceeded, the seat belt is tightened with a predetermined further belt force a predetermined period of time before the predicted maximum lateral acceleration $a_q$ is reached. As a result, the occupant, in particular the driver of the vehicle, is fastened to his/her vehicle seat in an improved manner during cornering.

Furthermore, the method provides that in the event of a predicted lateral acceleration $a_q$ exceeding a predetermined threshold value when driving round the bend, the seat belt is tightened with a predetermined belt force, wherein if a higher predetermined further threshold value is exceeded when driving round the bend, the seat belt is tightened with a predetermined higher belt force, such that the occupant is better secured to his/her vehicle seat when driving round the bend.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for dynamically securing an occupant strapped into a vehicle seat of a vehicle with a seat belt, the method comprising:
   storing a plurality of situation-dependent triggering thresholds for increasing a belt force acting on the seat belt;
   predicting a lateral acceleration to be expected in a course of a bend ahead of the vehicle based on image data of a vehicle environment acquired by at least one camera on the vehicle or based on acquired data of a navigation map;
   determining a current driving speed of the vehicle;
   selecting, based on a current situation of the vehicle and the current driving speed of the vehicle, one of the plurality of situation-dependent triggering thresholds, wherein the current situation is at least one of a driving mode set for the vehicle, a time of day or ambient brightness, a detected local accident frequency, and determined information from traffic signs; and
   increasing, responsive to the predicted lateral acceleration exceeding the selected one of the plurality of situation-dependent triggering thresholds, the belt force acting on the seat belt before the predicted lateral acceleration acts on the occupant,
   wherein the current situation further comprises at least one of detected signals from a rain sensor and a temperature outside of the vehicle.

2. The method of claim 1, further comprising:
   predicting a maximum lateral acceleration occurring when driving around the bend ahead of the vehicle,
   wherein, responsive to the selected one of the plurality of situation-dependent trigger thresholds being exceeded by the predicted maximum lateral acceleration, the seat belt is tightened with a predetermined further belt force a predetermined period of time before the predicted maximum lateral acceleration is reached by the vehicle.

3. The method of claim 2, wherein the predicted maximum lateral acceleration is determined based on detected curvature data and a detected current driving speed of the vehicle or based on a driver type.

4. The method of claim 1, further comprising:
   determining whether a predetermined threshold value is exceeded when driving around the bend ahead of the vehicle; and
   tightening, responsive to the predetermined threshold value being exceeded when driving around the bend ahead of the vehicle, the seat belt with a predetermined belt force,
   wherein the predetermined threshold value is higher than a threshold value of the selected one of the plurality of situation-dependent triggering thresholds, and
   wherein the predetermined belt force is higher than the increased belt force.

5. The method of claim 1, wherein an electric motor increases the belt force acting on the seat belt.

6. The method of claim 1, wherein
   the acquired image data of the vehicle environment is checked for plausibility based on the acquired data of the navigation map, or
   the acquired data of the navigation map is checked for plausibility based on the acquired image data of the vehicle environment.

7. A method for dynamically securing an occupant strapped into a vehicle seat of a vehicle with a seat belt, the method comprising:
- predicting a lateral acceleration to be expected in a course of a bend ahead of the vehicle based on image data of a vehicle environment acquired by at least one camera on the vehicle or based on acquired data of a navigation map;
- selecting one of a plurality of stored situation-dependent triggering thresholds based on a current situation of the vehicle, wherein the current situation of the vehicle is at least one of a driving mode set for the vehicle, a time of day or ambient brightness, a detected local accident frequency, and determined information from traffic signs; and
- increasing, responsive to the predicted lateral acceleration exceeding the selected one of the plurality of situation-dependent triggering thresholds, the belt force acting on the seat belt before the predicted lateral acceleration acts on the occupant,
- wherein the plurality of situation-dependent triggering thresholds are curves having predicted lateral acceleration on one axis and a current driving speed of the vehicle on another axis,
- wherein the current situation further comprises at least one of detected signals from a rain sensor and a temperature outside of the vehicle.

* * * * *